Oct. 19, 1965   T. E. LUDWIG   3,212,216
HERBICIDE APPLYING MACHINE
Filed April 15, 1963   3 Sheets-Sheet 1

INVENTOR.
Thurlow E. Ludwig
BY Theodore L. Brown
Attorney

Oct. 19, 1965  T. E. LUDWIG  3,212,216
HERBICIDE APPLYING MACHINE
Filed April 15, 1963  3 Sheets-Sheet 2

INVENTOR.
Thurlow E. Ludwig
BY Theodore L. Brown
Attorney

Oct. 19, 1965   T. E. LUDWIG   3,212,216
HERBICIDE APPLYING MACHINE
Filed April 15, 1963   3 Sheets-Sheet 3

INVENTOR.
Thurlow E. Ludwig
BY Theodore L. Brown
   Attorney

United States Patent Office 3,212,216
Patented Oct. 19, 1965

3,212,216
HERBICIDE APPLYING MACHINE
Thurlow E. Ludwig, R.F.D., Waldoboro, Maine
Filed Apr. 15, 1963, Ser. No. 273,141
5 Claims. (Cl. 47—1.5)

This invention relates in general to apparatus for applying chemical treatments to vegetation, and more particularly concerns a machine for applying herbicides by a rotary member to kill high weeds without injuring other lower vegetation present.

An object of this invention is to provide apparatus for selectively destroying weeds such as sweet fern and the like that grow higher than a lower crop vegetation such as low-bush blueberries, said apparatus including a layer of absorbent material to receive liquid herbicide and to apply it to the weeds while preventing contact of the herbicide with the lower vegetation, the layer being rotatable for application of the chemical to the weeds in a more thorough manner than prior art devices utilizing merely a dragged blanket form of applicator or the like.

Another object is to provide apparatus having a rotary member that twists the weeds, scrapes and wounds the weed stalks, even removing some of the leaves by such rotation, to enable the chemical herbicide to enter the weeds on the tops and bottoms of the leaves and along the stalks, more rapidly and efficiently than is possible with direct spraying or other prior art devices, resulting in great saving of time and chemicals.

An additional object is to provide a rotary chemical applicator that is readily adjustable in height, to selectively apply the chemical to only higher vegetation as well as to provide an applicator that may be raised to clear stumps or other surface obstructions and then lowered to follow the contour of the weed level.

These and further objects will be apparent from the accompanying specification and drawings, in which.

Figure 1:
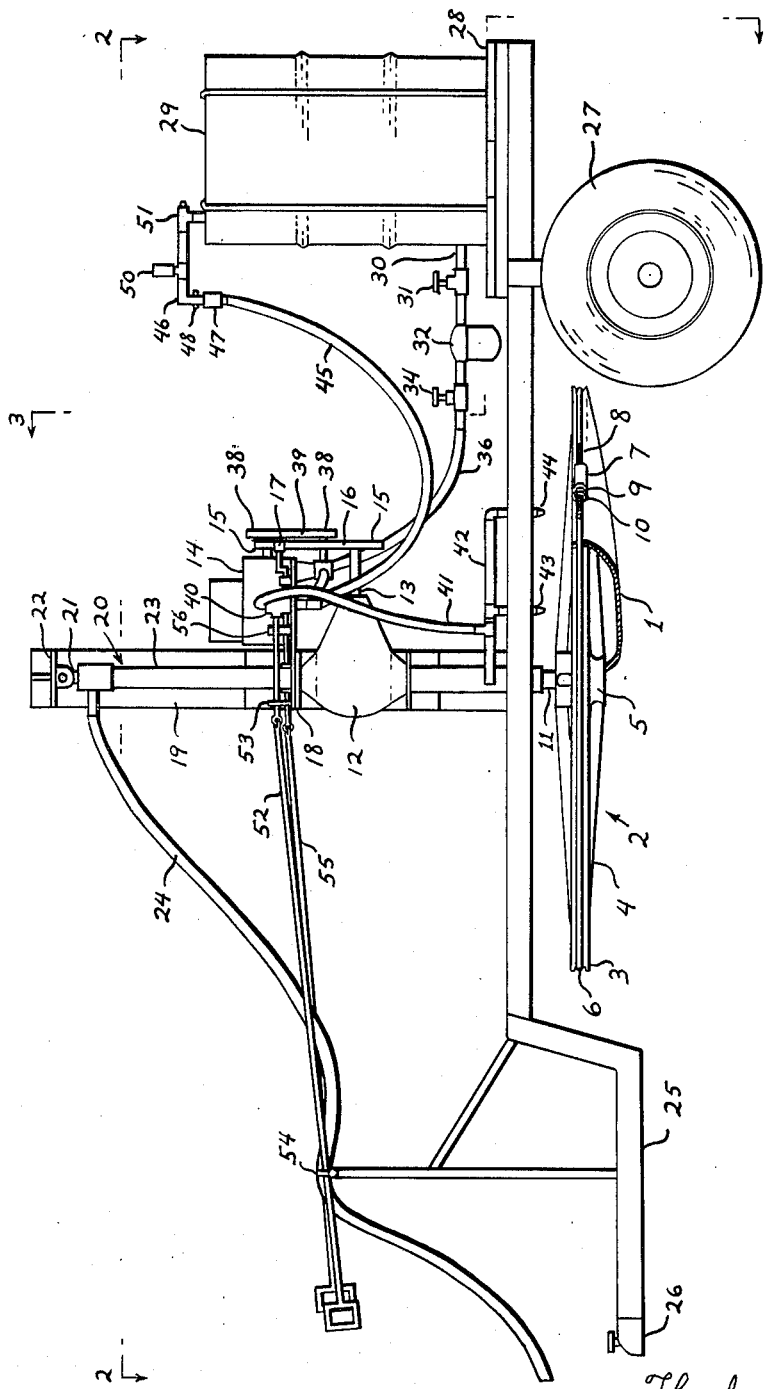
FIGURE 1 is a side view of a preferred embodiment of the invention, with the near vertical guide and part of the applicator layer removed to show the components.
Figure 2:
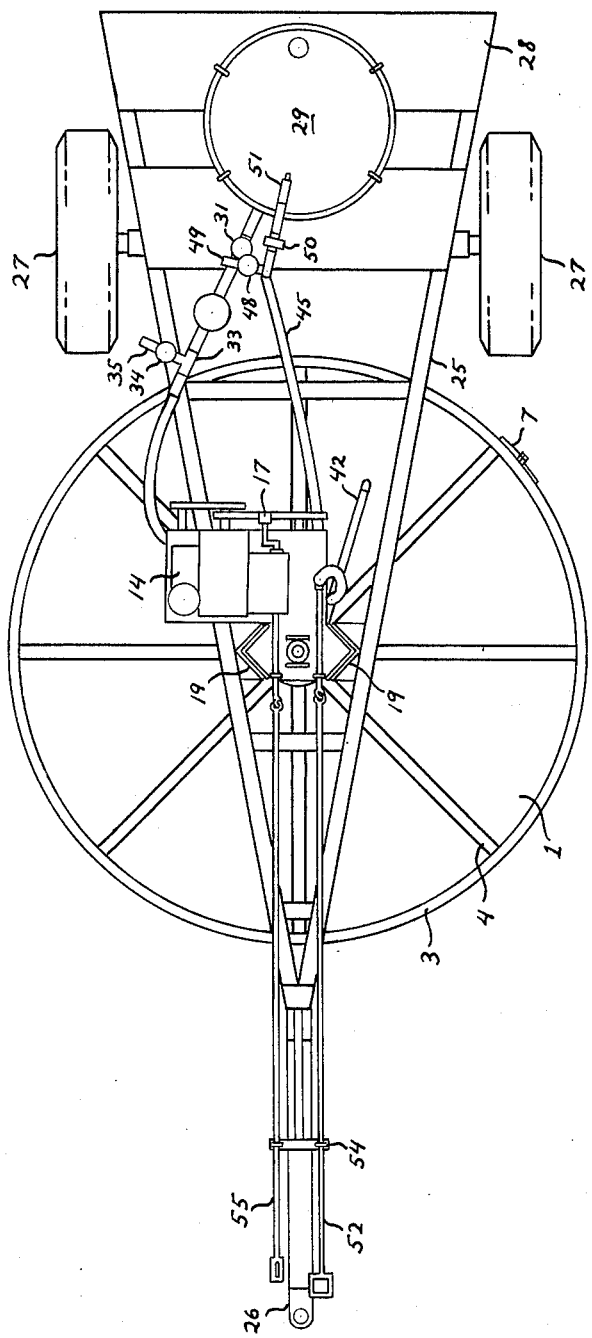
FIGURE 2 is a view from above, along line 2—2 of FIGURE 1 with the front hydraulic cylinder hose omitted.
Figure 3:
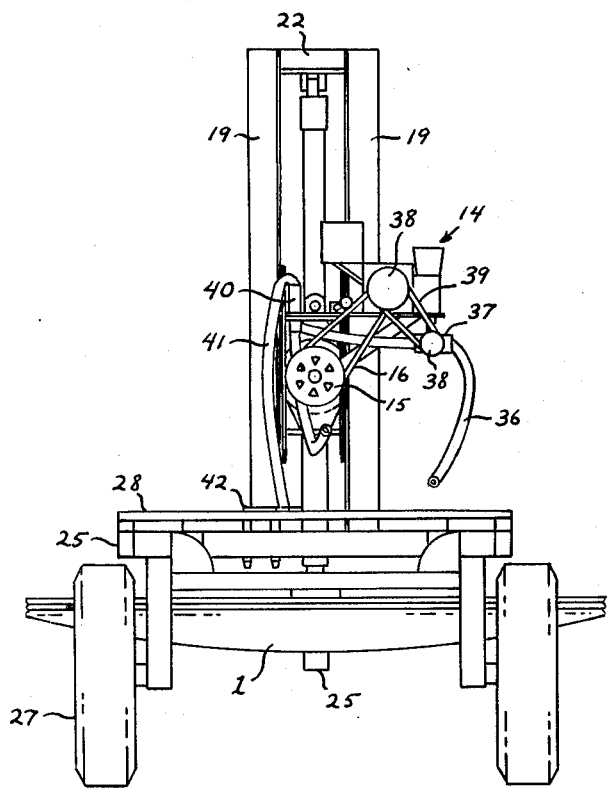
FIGURE 3 is a rear view of the preferred embodiment, along line 3—3 of FIGURE 1 with the rear chemical drum and most of its hose and adjacent fittings omitted.

Referring to the drawings, the preferred embodiment of the invention comprises a substantially planar chemical applicator 1 in the form of one or more layers of liquid absorbent means such as felt blanket material, attached by appropriate means to a supporting member 2 mounted for rotation about a vertical axis. The supporting member as shown comprises a circular wheel having a rim 3, spokes 4, and central hub 5. The wheel may be six feet in diameter, or other desired size. The blanket is held to the rim by an outer clamping hoop 6 having a socket 7 attached on one end as by welding, with the other end 8 threaded and passing through the socket into clamping nut 9 and lock nut 10. The rim may be in the form of a C-shaped channel member, with the opening facing outwardly to receive the hoop and blanket to prevent dislodging them off the rim.

The hub is mounted on a shaft 11 connected to a reduction gear box 12, for example an automobile rear end having a four-to-one reduction. The drive shaft 13 of such rear end is driven by appropriate means, which as shown may comprise a gasoline engine 14 of approximately three horsepower or more, connected to drive shaft 13 by pulleys 15, V-belt 16 and clutch wheel 17. The pulley connection, and any additional reduction box on the engine, may for example provide a six-to-one reduction from the engine to the shaft 13 so that, depending on the adjustment of the engine governor, the wheel and applicator blanket may rotate at forty to fifty revolutions per minute while being moved forward at normal tractor speed.

The engine and rear end are mounted on supporting framework 18 having vertical slides which may be in the form of angle irons, slidable within outer guides or angle irons 19 mating therewith to retain the framework while permitting vertical adjustment of the rotary wheel to different heights. The adjustment is provided by a hydraulic cylinder 20 having its inner piston member 21 connected to an upper crosspiece 22 attached to the upper ends of guides 19, which crosspiece maintains the guides apart and parallel, with the cylinder outer casing 23 attached at its lower end to the engine-supporting framework 18. Hose 24 leads from the hydraulic cylinder to the hydraulic power system on the tractor, and may be controlled by the appropriate valve on the tractor provided as standard equipment and forming no part of the present invention. Means may be provided to limit the lower position of the wheel applicator, such as a stop member below framework 18 or a check chain extending from the framework up to crosspiece 22, to prevent contact with the ground or with blueberry bushes for example.

The lower ends of vertical guides 19 are secured to frame 25 formed of channel iron having appropriate side- and cross-members as desired. A standard trailer hitch 26 is attached to the front end of the frame for connection to the tractor. At the rear of the frame are mounted two supporting tire assemblies 27, which may include automobile front spindles welded to downwardly extending channel members of the frame. Above the frame at the rear, a platform 28 is provided for supporting a chemical tank 29 such as a fifty-five gallon drum, held firmly to the platform by J-bolts or other appropriate clamping means.

At the bottom of the drum, outlet pipe 30 leads to a shut-off valve 31; this is of the metal gate type or the like, because a valve utilizing a screwed-down leather or rubber washer would be attacked by the chemical. One utilizing a washer of plastic not attacked by the chemical would be suitable, however. The pipe then leads to filter 32. Beyond the filter is a side inlet connection pipe 33 having a shut-off valve 34 and an inlet 35, to which a hose may be connected for filling the drum from a large storage tank with valve 31 closed and valve 34 open. Pipe 30 then leads to feed line hose 36, connected at its other upper end to a chemical pumping means 37 also mounted on supporting framework 18 and driven by the engine 14 through appropriate pulleys 38 and belt 39. The pumping means may comprise a plastic impeller, or may be a gear pump for higher pressure; either form provides sufficient pressure, and keeps the liquid mixed as well. The feed line 36 must be a flexible hose so as to not restrict the vertical adjustability of the wheel applicator relative to the fixed drum.

The pump outlet is connected through a control valve 40 to hose 41 leading to horizontal pipe 42 having one end closed and suitably attached to the fixed casing surrounding shaft 11, with the other end extending out radially over the wheel and leading to nozzles 43 and 44 which may be adjusted to control the spray on the applicator blanket. For heavy growth of weeds requiring a large amount of chemical, both nozzles may be used; but for normal growth, the center nozzle near the hub will suffice since the liquid travels to the edge by centrifugal force and will keep the blanket sufficiently moist.

The pump outlet also leads to bypass hose 45 connected to pipe 46. Lines 41 and 45 must also be flexible hose, as is line 36, to permit vertical adjustment of the applicator. The pipe 46 has a side outlet connection pipe 47 with a shut-off valve 48 and outlet 49, to which may be connected a long hose for handspraying inaccessible areas. Beyond connection 47, pipe 46 leads to a pressure gauge 50, which indicates when the liquid is exhausted, when the pump is not functioning properly or the lines leak, or other cause of reduced pressure. Beyond the gauge is connected adjustable relief valve 51 for a safety blow-off; this restricts the flow through the bypass line, providing back pressure so that some chemical will be forced through nozzles 43 and 44, or through outlet 49 if a hand-spray hose is used. Pipe 46 then leads to the top of the drum, adding pressure so that the drum is not under vacuum, recirculating the liquid, and providing agitation to keep the chemical well mixed. Such mixing, by the pump and agitated recirculation, is very important since the herbicides 2,4-D and 2,4,5-T tend to separate out from the water or other medium used as a thinning base.

Control rod 52 leads from control valve 40 through appropriate vertical guides 53 and 54 on the framework 18 and frame 25 respectively to the front of the unit near the tractor, so that the operator can rotate the rod to control the flow from the nozzles without leaving his seat. The guides permit the rod to pivot when the applicator is raised or lowered. Similarly, control rod 55 leads from clutch wheel 17 through appropriate guides on the framework 18 and frame 25 to the front of the machine, so that the operator may rotate that rod to place the clutch wheel into or out of engagement with V-belt 16, to tighten or release its contact with pulleys 15 as is common with such engines. Framework 18 may carry a sleeve 56 through which rod 55 passes, the sleeve having a ball or stud detent spring-biased to snap into a mating recess in the rod when the clutch wheel 17 presses the V-belt into tight engagement with the pulleys.

The operation of the apparatus is apparent from the preceding description of the elements of the preferred embodiment. As the blanket applicator rotates, it scrubs the weeds thoroughly with the herbicide, turning the leaves over and wiping the stalks all the way around them. The applicator is of sufficiently coarse texture to provide some scraping of the skin of the weed stalks and leaves, which further enhances the rapidity and effectiveness of the killing operation. No spray will be wasted on the ground, resulting in an enormous saving of the chemical as well as a saving of the lower blueberry bushes. The apparatus can be used on rough ground, or land with surface obstructions such as stumps or rocks, as easily as on smooth land, and for very inaccessible areas provision is made for a hand-spraying hose attachment eliminating the need of a separate sprayer.

The forms of structural members and the ratios or sizes mentioned above are not intended to limit the invention, but are listed merely to provide a clear description of one form of the device as actually found practical. The members used are rugged, due to the nature of the terrain used for blueberry fields. The capacity of the drum listed above keeps down the overall weight of the unit, and yet is sufficient for three hours or more of operation.

As an example of the savings in cost of labor, time and materials: a test plot that previously took two men seven days and sixteen drums of chemical to spray with a power sprayer and a fifty-foot hose, killing the bluebarry bushes and leaving patches of unkilled weeds because of the effect of the wind and unregulated spraying time and the like, now took one man twelve hours and only four drums of chemical to wipe with the rotary applicator of this invention, and none of the bluebery bushes were killed while all of the weeds were.

Many modifications of the apparatus will be apparent to the artisan. For example, other forms may use an electric motor or hydraulic motor, or may be operated by appropriate mechanism connected to the power take-off of the tractor, rather than a gasoline engine; may have the wheel applicator mounted on a boom extending beyond the side of the frame for applying herbicide along the highway; such boom may be pivoted to allow the blanket to be parallel to sloped embankments; two or more rotary applicators may be mounted side by side to cover a greater path; and so forth. However, the invention is to be limited only by the scope of the following claims.

I claim:
1. Apparatus for applying chemicals to vegetation comprising a wheeled frame, an absorbent wiper member mounted on said frame, driving means on said frame connected to said wiper member for rotation of the same about a vertical axis, and chemical supply means on said frame including chemical recirculation means and chemical outlet means located above said wiper member and adapted to distribute chemical to at least one portion thereof.

2. Apparatus as in claim 1 wherein said wiper member is adjustably mounted on said frame for changing the position of the wiper member.

3. Apparatus as in claim 2 wherein said wiper member is adjustably mounted for raising and lowering the wiper member.

4. Apparatus as in claim 1 wherein said wiper member is circular and substantially planar, and is rotated about an axis perpendicular to the plane of the wiper member at its center.

5. Apparatus as in claim 1 wherein said chemical outlet means comprises at least one spray nozzle directed at said wiper member.

References Cited by the Examiner

UNITED STATES PATENTS

| | | | |
|---|---|---|---|
| 1,672,058 | 6/28 | Cole | 47—1.5 |
| 3,077,701 | 2/63 | Osmun | 47—1.5 |

FOREIGN PATENTS

| | | |
|---|---|---|
| 114,164 | 10/41 | Australia. |
| 1,019,004 | 10/52 | France. |

ABRAHAM G. STONE, *Primary Examiner.*

THEODORE G. CRAVER, *Examiner.*